(12) United States Patent
Wang et al.

(10) Patent No.: US 6,348,250 B1
(45) Date of Patent: Feb. 19, 2002

(54) OPTICAL RECORDING MEDIUM COMPRISING PHTHALOCYANINES SUBSTITUTED BY BICYCLIO-ALKOXY GROUPS

(75) Inventors: Shyh-Yeu Wang, Tao Yuan Hsien; Jen-Hua Chung, Chang Hua Hsien; Chwei-Jing Yeh, Taipei Hsien, all of (TW)

(73) Assignee: Ritek Corporation, Hsin Chu (TW)

( * ) Notice: Subject to any disclaimer, the term of this patent is extended or adjusted under 35 U.S.C. 154(b) by 0 days.

(21) Appl. No.: 09/427,721

(22) Filed: Oct. 27, 1999

(51) Int. Cl.$^7$ .................................................. B32B 3/02
(52) U.S. Cl. ..................... 428/64.1; 428/64.8; 428/913; 430/270.17; 430/270.19
(58) Field of Search ................................ 428/64.1, 64.2, 428/64.4, 64.8, 913; 430/270.16, 270.17, 270.19, 270.2, 495.1, 945; 369/283, 288

(56) References Cited

U.S. PATENT DOCUMENTS

| | | | | |
|---|---|---|---|---|
| 5,693,396 A | * | 12/1997 | Misawa | 428/64.1 |
| 5,776,656 A | * | 7/1998 | Shinkai | 430/270.19 |
| 5,973,140 A | * | 10/1999 | Kumagae | 540/125 |
| 6,017,604 A | * | 1/2000 | Kitagawa | 428/64.1 |

\* cited by examiner

*Primary Examiner*—Elizabeth Evans
(74) *Attorney, Agent, or Firm*—Rosenberg, Klein & Lee

(57) ABSTRACT

An optical recording medium is provided that includes a spirally grooved polymer substrate, a recording layer, a reflecting layer, and a protection layer. The recording layer includes one or a mixture of phthalocyanine dyes. The phthalocyanine dye includes a bicyclo-alkyl substituent, providing solubility in any of a plurality of solvents that will not damage the surface of the substrate.

2 Claims, No Drawings

OPTICAL RECORDING MEDIUM COMPRISING PHTHALOCYANINES SUBSTITUTED BY BICYCLIO-ALKOXY GROUPS

BACKGROUND OF THE INVENTION

1. Field of the Invention

The present invention relates to an optical recording medium wherein the recording layer contains phthalocyanine dye, said phthalocyanine dye being substituted by bicyclo-alkoxy groups to increase its solubility.

2. Description of Related Art

The art of using certain dyes in optical recording medium has been known for many years. The physical structure of optical recording medium consists of four layers which are polymer substrate, recording layer, reflecting layer and protecting layer. A dye solution is spin coated on a spirally grooved transparent substrate to form a recording layer. Then a gold or silver reflecting layer is sputtered on the recording layer. UV cured protecting lacquer is spin coated on the reflecting layer. Digital information can be recorded into the thus obtained medium by using a laser. The wavelength of laser used to write information into the optical recording medium is between 770–790 nm. Corresponding to the wave length of the laser, the dye used in the optical recording medium is better to have a maximum absorption wave length($\lambda$ max) in between 650–750 nm and a molar absorptivity($\epsilon$) greater than $1 \times 10^5$ $cm^{-1}$ $mole^{-1}$ liter Among the different dyes used in the optical recording medium, cyanine dye is one of the most used recording materials. It is the most successfully commercialized optical recording material and remains to be the most important one. Cyanine dye has the advantages of good optical sensitivity, better solubility and comparatively lower cost. The disadvantage of cyanine dye is its lack of light and environment stability which affect the long term stability of the optical recording medium.

Another dye used in the optical data storage medium is phthalocyanine dye. Phthalocyanine dye has advantages of excellent light and environment stability which cyanine dye lack of and its disadvantage is its low solubility.

It is well known that phthalocyanine does not dissolve in common organic solvent. However, one of the requirements for any dye to be used as a recording material is that the solubility of the dye in common organic solvent has to be high enough in order to be applied to the spin coating process. In order to solve the solubility problem of phthalocyanine dye, many structure modifications have been disclosed in many different patents. The most common solution used to increase the solubility of phthalocyanine dye is to incorporate one or more than one bulky substitutent into the phthalocyanine molecule. The incorporation of bulky substitutent will increase the packing distance of the phthalocyanine molecule which will prevent the association of phthalocyanine molecules and slow down the rate of crystallization or eventually suppress the crystallization to give an amorphous phthalocyanine dye. These modifications of phthalocyanine molecule can increase the solubility of phthalocyanine in common solvent like diacetone alcohol, n-propanol, methyl cyclohexane(MCH), dimethyl cyclohexane, methyl cellosove, ethyl cellosove, tetrafluoropropanol, di-n-butyl ether and the same and make it suitable for the spin coating process.

The most commonly used bulky substitutents are long chain linear and branched alkoxy groups. Although the linear and branched long chain alkoxy substitutents have a very pronounce effect in increasing the solubility of phthalocyanine molecule, but only the linear or branched long chain substitutents are not enough to make the solubility of phthalocyanine dyes in those solvents mentioned above to be high enough to be used in the optical recording medium manufacturing process. This is one of the reasons why other substitutents have to be incorporated into the phthalocyanine molecule structure.

U.S. Pat. Nos. 5,280,114, 5,358,833, 5,446,142, 5,693,396 and 5,695,911 disclosed the use of linear or branched alkoxy and bromide substitutents in the same time to increase the solubility of phthalocyanine dye.

U.S. Pat. No. 5,641,897 disclosed a phthalocyanine substituted by linear or branched alkoxy, bromide and phosphorous containing group.

Another important issue for phthalocyanine dyes is about the stability of dye solution. Most of the phthalocyanine dye solution can not be stored too long and is better to be used up right after preparation. The dye in the solution tends to associate and precipitate out in a short time. And also when the solution is running in the tube of production line, due to the limited solubility of the dye in the solvent, the dye will also associate and precipitate will form in the tube. The said precipitate will cause a big problem in production, especially it will affect the quality of the optical recording medium.

It is the first object of this invention to provide a phthalocyanine dyestuff with bicyclo-alkoxy substitutents to improve its solubility in common organic solvent. This phthalocyanine dyestuff has maximum absorption wave length at about 680–750 nm and high absorptivity of near infrared laser.

It is the second object of the present invention to provide an optical recording medium using phthalocyanine dyes with bicyclo alkoxy substitutents as optical recording material.

DETAIL DESCRIPTION

The present invention provides phthalocyanine dyes having maximum absorption wave length at about 680–750 nm and can be dissolved in common organic solvent. The phthalocyanines of the present invention have the following general formula (I)

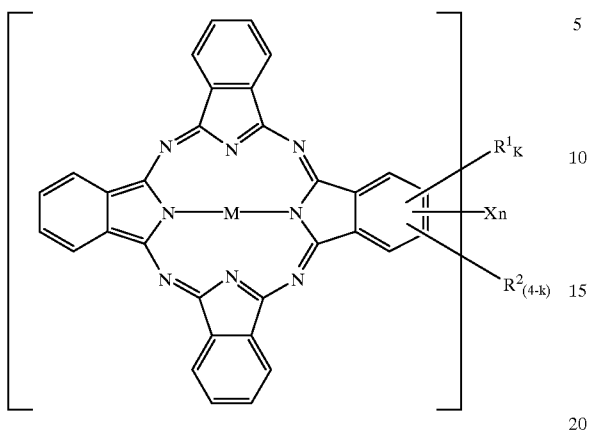

(I)

wherein:
M is divalent metal selected from the group consisting of Pb, Pd, Ni, Cu, Zn, Co, Mg and Fe or divalent oxo metal like VO or TiO,
X is halogen atom like bromide or iodide,
n is 0 or an integer of 1 to 4;
k is any number from 1 to 4;
$R^1$ is alkoxy substituent derived from hydroxy-containing bicyclo-alkyl compounds. The said hydroxy-containing bicyclo-alkyl compounds can be represent by formula (II) and (III),

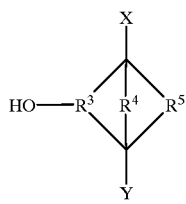

(II)

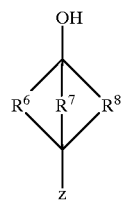

(III)

Wherein, X Y and Z are, independent from each other, a hydrogen atom, halogen, methyl or ethyl groups. R3 to R8 are, independent from each other, $C_{1-4}$ linear or branched alkyl group with or without halogen substitutent group.

$R^2$ is $C_{1-20}$ linear alkyl group with or without substitutent group, $C_{1-20}$ branched alkyl group with or without substitutent group, $C_{1-20}$ linear alkoxy group with or without substitutent group, $C_{1-20}$ branched alkoxy group with or without substitutent group and aryloxy groups with or without substitutent group; The said substitutent group can be halogen, $OR^9$, $SO_2R^{10}$, $OCOR^{11}$, $COOR^{12}$, $NR^{13}R^{14}$, where in $R^9$, $R^{10}$, $R^{11}$, $R^{12}$, $R^{13}$, $R^{14}$ are $C_{1-12}$ linear or branched alkyl groups.

The phthalocyanine dyes represented by formula (I) can be synthesized from the starting materials of phthalonitrle (compound 1a and 2a) or diiminoisoindolenine (compound 1b and 2b), where $R^1$ and $R^2$ are the same as in formula (I).

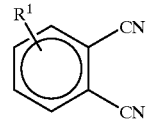

Compound 1a

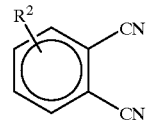

Compound 2a

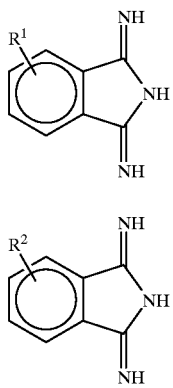

Compound 1b

Compound 2b

The starting material used in the synthesis is a mixture of compound 1 and compound 2. The molar content of compound 1 in the mixture is from 25% to 100%, preferably 50% to 100%.

The phthalocyanine dye of this invention has excellent solubility in common organic solvent used in the CD-R manufacturing process. The phthalocyanine dye of this invention has a better solubility than the phthalocyanine dye with only linear or branched alkoxy substitutents. After dissolution, the shelf life of the result solution is also much longer.

The manufacturing of optical recording medium is further described as follow. First, a spirally grooved polymer substrate is prepared by injection molding. The materials for the substrate can be any transparent amorphous polymer with good dimension stability, zero or very low birefringence, good thermal and mechanical properties. The most prefer polymers are polymethylmethacrylate, polycarbonate and amorphous polyolefin.

Then a recording layer containing one or a mixture of more than one phthalocyanine dye represented by formula (I) is obtained by spincoating or vapor deposition process. If using the spin coating process to obtain the recording layer, the said phthalocyanine dye has to be dissolved in certain solvent. The solvent can be a pure solvent or a mixture of different solvents. The most important requirement for the solvent or solvent mixture is that it should be able to dissolve a fare amount of dye and not to damage the surface of the substrate. The common used solvents include ethanol, 1-propanol, 2-propanol, methoxyethanol, ethoxyethanol, tetrafluoropropanol, diaceton alcohol, n-butyl ether, n-propyl ether, methyl cyclohexane, dimethyl cyclohexane, ethyl cyclohexane, acetone, methyl ethyl ketone, tetrahydrofuran, . . . etc.

A reflecting layer is then deposited on the recording layer by sputtering. The material used for the reflecting layer can be Au, Ag or Al. Finally a protecting layer is formed by spin coating a UV curable lacquer on the reflecting layer.

The recording layer can also comprise a mixture of the said phthalocyanine dye and cyanine dyes. The prefer cyanine dyes comprise indolenine or benzoindolenine groups and have maximun absorption wave length is between 640–750 nm, preferable between 660–720.

The recording layer can further comprise a mixture of dyes and polymers. The said dye is a single component of phthalocyanine or a mixture of phthalocyanine and cyanine dyes. The said polymers should be an optical transparent and amorphous materials. The glass transition temperature should be higher than 80° C. and should be able to dissolved in the solvents mentioned above. The prefer polymers includes polymethylmethacrylate, polystyrene, amorphous polyamide, novolak epoxy, polyvinylalcohol, polyvinylacetate and polyvinylether.

The procedure of dye synthesis, the result of solubility test and the result of optical recording medium test are further described as follow.

Synthesis of phthalonitrile A

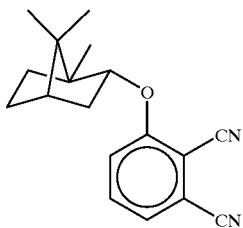

A sodium alcoholate solution was prepared by first placing 9.6 g of 60% NaH and 150 ml of dry dimethylformamide (DMF) into a 500 ml three neck glass reactor equipped with magnetic stirrer, reflux condenser, addition funnel and nitrogen inlet. The solution was stirred gently under the feed of nitrogen and cooled to a temperature lower than 20° C. 37.75 g of Isoboranol was transfer into the addition funnel and added slowly into the 500 ml reactor. The whole solution was stirred for 3 hours at a temperature below 20° C.

Another 1 liter three neck reactor was equipped with mechanical stirrer, nitrogen inlet and addition funnel. 34.5 g of 3-nitrophthalonitrile and 150 ml of dry DMF was added into the 1 liter reactor with nitrogen feeding. The sodium alcoholate/DMF solution was transferred from the 500 ml reactor to the addition funnel attached to the 1 liter reactor and added dropwisely to the 1 liter reactor within 5 hours at room temperature. The reaction solution was stirred for overnight at room temperature. The reaction solution was poured into 5 liter vessel containing 3 liter of water with slow agitating. Then the 5 liter vessel was allowed to stand still for 30 min. The crystal formed was filtered and dried. Recrystallization was carried out by using methanol as solvent to give 31 g of product (yield=55%). mp=140–142° C., $H^1$NMR-400 (DMSO-$d^6$): δ 7.79 (t, 1H), 7.6(dd, 2H), 4.38(t, 1H), 1.96(m, 1H), 1.75(t, 1H), 1.65(m, 3H), 1.53(m, H), 1.23(m,2H), 1.07(m, 2H), 1.00(s, 3H), 0.97(s,3H), 0.84 (m, 3H).

Synthesis of phthalonitrile B

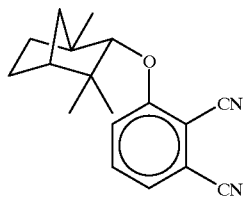

A sodium alcoholate solution was prepared by first placing 9.6g of 60% NaH and 150 ml of dry dimethylformamide (DMF) into a 500 ml three neck glass reactor equipped with magnetic stirrer, reflux condenser, addition funnel and nitrogen inlet. The solution was stirred gently under the feed of nitrogen and cooled to a temperature lower than 20° C. 38.4 g of endo-fensol was transferred into the addition funnel and added slowly into the 500 ml reactor. The whole solution was stirred for 3 hours at a temperature below 20° C.

Another 1 liter three neck reactor was equipped with mechanical stirrer, nitrogen inlet and addition funnel. 34.5 g of 3-nitrophthalonitrile and 150 ml of dry DMF was added into the 1 liter reactor with nitrogen feeding. The sodium alcoholate/DMF solution was transferred from the 500 ml reactor to the addition funnel attached to the 1 liter reactor and added dropwisely to the 1 liter reactor within 5 hours at room temperature. The reaction solution was stirred for overnight at room temperature. The reaction solution was poured into 5 liter vessel containing 3 liter of water with slow agitating. Then the 5 liter vessel was allowed to stand still for 30 min. The crystal formed was filtered and dried. Recrystallization was carried out by using methanol as solvent to give 34 g of product (yield=60.7%). mp=92–94° C., $H^1$NMR-400(CDCl$_3$): 7.57(t, 1H), 7.28(d, 1H), 7.21(d, 1H), 4.01(d, 1H), 2.09(m. 1H), 1.76(m, 2H), 1.58(m, 1H), 1.50(m, 1H), 1.27(m, 2H), 1.14(s, 3H), 1.10(s, 3H), 0.85(s, 3H).

EXAMPLE 1

A 500 ml three neck glass reactor was equipped with magnetic stirrer, reflux condenser and nitrogen inlet. 22.2 g(0.08 mole) of phthalonitrile A, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 3.54 g (0.02 mole) of palladium dichloride was added and the temperature was raised to 120–130° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 16.2 g of palladium phthalocyanine dye (yield=66.0%). λmax=690 nm; ε=1.81×10$^5$ cm$^{-1}$ mole$^{-1}$ liter(toluene).

Anal. calcd. for $C_{72}H_{80}N_8O_4Pd$: C, 70.43%; H, 6.57%; N, 9.13%.

Found: C, 71.01%; H, 6.40%; N, 8.91%.

EXAMPLE 2

The same reactor as example 1 was equipped. 22.2 g(0.08 mole) of phthalonitrile A, 20 g of 1.8-DIAZA BICYCLO

[5.4.0]-UNDEC-ENE(DBU) and 80 ml of n-amyl alcohol were added into the reactor. The nitrogen feed and stirring was started and temperature of the solution was raised to 90° C. 5.56 g (0.02 mole) of lead dichloride was added and the temperature was raised to 120–130° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 13.5 g of lead phthalocyanine dye(yield=50.8%). $\lambda$max=741 nm; $\epsilon$=1.3×105 cm$^{-1}$ mole$^{-1}$ liter(toluene).

Anal. calcd. for $C_{72}H_{80}N_8O_4Pb$: C, 65.09%; H, 6.07%; N 8.43%

Found: C, 68.31%; H, 6.86%; N, 8.58%.

EXAMPLE 3

The same reactor as example 1 was equipped. 22.2 g(0.08 mole) of phthalonitrile B, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 3.54 g (0.02 mole) of palladium dichloride was added and the temperature was raised to 120–130° C. for overnight. 200 ml of ethyl acetate was added into the cooled reaction solution. The whole solution was filtered to removed insoluble solid. The filtrate was passed through column with 100 g of silica gel by using ethyl acetate as eluent solvent. The solvent was removed and the solid obtained was dissolved in minimum amount of toluene. The toluene solution was poured into large excess of methanol. The precipitate was collected and dried to give 17.3 g of palladium phthalocyanine dye(yield=70.5%). $\lambda$max=691 nm; $\epsilon$=1.60×10$^5$ cm$^{-1}$ mole$^{-1}$ liter(toluene). Anal. calcd. for $C_{72}H_{80}N_8O_4Pd$: C, 70.43%; H, 6.57%; N, 9.13%.

Found: C, 71.13%; H, 7.31%; N, 8.80%.

EXAMPLE 4

The same reactor as example 1 was equipped. 22.2 g (0.08 mole) of phthalonitrile B, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 5.30 g (0.02 mole) vanadyl acetylacetonate was added and the temperature was raised to 120–130° C. for overnight. 100 ml of ethyl acetate was added into the cooled reaction solution. The whole solution was filtered to removed insoluble solid. The filtrate was passed through column with 100 g of silica gel by using ethyl acetate as eluent solvent. The solvent was removed and the solid obtained was dissolved in minimum amount of toluene. The toluene solution was poured into large excess of methanol. The precipitate was collected and dried to give 15.7 g of vanadyl phthalocyanine dye(yield=66.1%). $\lambda$max=739 nm; $\epsilon$=1.56×10$^5$ cm$^{-1}$ mole$^{-1}$ liter(toluene). Anal. calcd. for $C_{72}H_{80}N_8O_4VO$: C, 72.77%; H, 6.78%; N, 9.43%.

Found: C, 71.71%; H, 7.26%; N, 8.44%.

EXAMPLE 5

The same reactor as example 1 was equipped. 22.2 g(0.08 mole) of phthalonitrile B, 20 g 1.8-DIAZA BICYCLO [5.4.0]-UNDEC-ENE(DBU) of and 80 ml of n-amyl alcohol were added into the reactor. The nitrogen feed and stirring was started and temperature of the solution was raised to 90° C. 5.56 g (0.02 mole) lead dichloride was added and the temperature was raised to 120–130° C. for overnight. 200 ml of ethyl acetate was added into the cooled reaction solution. The whole solution was filtered to removed insoluble solid. The filtrate was passed through column with 100 g of silica gel by using ethyl acetate as eluent solvent. The solvent was removed and the solid obtained was dissolved in minimum amount of toluene. The toluene solution was poured into large excess of methanol. The precipitate was collected and dried to give 14.9 g of lead phthalocyanine dye(yield= 56.1%). $\lambda$max=741 nm; $\epsilon$=1.41×10$^5$ cm$^{-1}$ mole$^{-1}$ l(toluene). Anal. calcd. for $C_{72}H_{80}N_8O_4Pb$: C, 65.09%; H, 6.07%; N, 8.43%.

Found: C, 64.51%; H, 7.10%; N, 8.02%.

EXAMPLE 6

The same reactor as example 1 was equipped. 22.2 g(0.08 mole) of phthalonitrile B, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 2.69 g (0.02 mole) of copper dichloride was added and the temperature was raised to 140–145° C. for overnight. 150 ml of toluene was added into the cooled reaction solution. The whole solution was filtered to removed insoluble solid. The filtrate was passed through column with 100 g of silica gel by using ethyl acetate as eluent solvent. The solvent was removed and the solid obtained was dissolved in minimum amount of toluene. The toluene solution was poured into large excess of methanol. The precipitate was collected and dried to give 17.2 g of copper phthalocyanine dye(yield= 72.6%). $\lambda$max=708 nm; $\epsilon$=2.15×105 cm$^{-1}$ mole$^{-1}$ liter (toluene). Anal. calcd. for $C_{72}H_{80}N_8O_4Cu$: C, 72.98%; H, 6.80%; N, 9.46%.

Found: C, 72.07%; H, 6.82%; N, 9.19%.

EXAMPLE 7

The same reactor as example 1 was equipped. 22.2 g(0.08 mole) of phthalonitrile B, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 2.73 g (0.02 mole) of zinc dichloride was added and the temperature was raised to 120–130° C. for overnight. 200 ml of ethyl acetate was added into the cooled reaction solution. The whole solution was filtered to removed insoluble solid. The filtrate was passed through column with 100 g of silica gel by using ethyl acetate as eluent solvent. The solvent was removed and the solid obtained was dissolved in minimum amount of toluene. The toluene solution was poured into large excess of methanol. The precipitate was collected and dried to give 17.5 g of zinc phthalocyanine dye(yield= 73.1%). $\lambda$max=708 nm; $\epsilon$=1.83×105 cm$^{-1}$ mole$^{-1}$ liter (toluene). Anal. calcd. for $C_{72}H_{80}N_8O_4Zn$: C, 72.86%; H, 6.79%; N, 9.44%.

Found: C, 73.10%; H, 6.25%; N, 8.99%.

EXAMPLE 8

The same reactor as example 1 was equipped. 11.1 g(0.04 mole) of phthalonitrile B, 20 g of 1.8-DIAZA BICYCLO

[5.4.0]-UNDEC-ENE(DBU) and 80 ml of n-amyl alcohol were added into the reactor. The nitrogen feed and stirring was started and temperature of the solution was raised to 90° C. 3.54 g (0.02 mole) of palladium dichloride was added and the temperature was raised to 120–130° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 15.0 g of palladium phthalocyanine dye(yield=61.1%). λmax=692 nm; ε=1.62×105 cm$^{-1}$ mole$^{-1}$ liter(toluene). Anal. Calcd. for $C_{72}H_{80}N_8O_4Pd$: C, 70.43%; H, 6.57%; N, 9.13%.

Found: C, 71.01%; H, 6.43%; N, 8.89%.

EXAMPLE 9

The same reactor as example 1 was equipped. 11.1 g(0.04 mole) of phthalonitrile B, 9.68 g(0.04 mole) of 3-(2,4-dimethyl-3-pentoxy)phthalonitrile, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 2.69 g (0.02 mole) of copper dichloride was added and the temperature was raised to 140–145° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 15.8 g of copper phthalocyanine dye(yield=71.3%). λmax=707 nm; ε=2.08× 10$^5$ cm$^{-1}$ mole$^{-1}$ liter(toluene)

EXAMPLE 10

Bromonation of Phthalocyanine

A three neck 300 ml reactor was equipped with an addition funnel, a condenser and mechanical stirrer. 10 g of palladium phthalocyanine(example 3) and 55 g of 1,1,2-trichloroethane were added into the reactor. Stirring was started. After 10 minutes, 20 g of water was added and the temperature of solution was raised to 55° C. 5 g of bromine was dissolved in 12 g of 1,1,2-trichloroethane. The bromine solution was added dropwisely into the reactor. After addition of the bromine solution, the reaction was carried out at 60° C. for 1 hour. 20 g of 10% $NaHSO_3$ aqueous solution was added into the cooled solution and stirring was continuing until the organic phase turned into dark green. The organic phase was collected and washed twice with 100 ml of water. The organic phase was dried with magnesium sulfate and passed through silica gel column using toluene as eluent solvent. The solvent was removed and the solid obtained was dissolved in minimum amount of toluene. The toluene solution was poured into large excess of methanol. The precipitate was collected and dried to give 8.5 g of brominated palladium phthalocyanine. λmax=708 nm.

COMPARATIVE EXAMPLE 1

The same reactor as example 1 was equipped. 19.36 g (0.08 mole) of 3-(2,4-dimethyl-3-pentoxy)phthalonitrile, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 2.69 g (0.02 mole) of copper dichloride was added and the temperature was raised to 140–145° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 15.0 g of copper phthalocyanine dye(yield=72.7%). λmax=692 nm; ε=1.90× 10$^5$ cm$^{-1}$ mole$^{-1}$ l(toluene). Anal. Calcd. For $C_{60}H_{72}N_8O_4Cu$: C, 69.77%; H, 7.03%; N, 10.85%.

Found: C, 70.51%; H, 7.65%; N, 10.12%.

COMPARATIVE EXAMPLE 2

The same reactor as example 1 was equipped. 19.36 g(0.08 mole) of 3-(2,4-dimethyl-3-pentoxy)phthalonitrile, 20 g of 1.8-DIAZA BICYCLO [5.4.0]-UNDEC-ENE(DBU) and 80 ml of n-amyl alcohol were added into the reactor. The nitrogen feed and stirring was started and temperature of the solution was raised to 90° C. 3.54 g (0.02 mole) of palladium dichloride was added and the temperature was raised to 140–145° C. for overnight. 100 ml of toluene was added into the cooled reaction solution. The whole solution was filtered to removed insoluble solid. The filtrate was passed through column with 100 g of silica gel by using toluene as eluent solvent. The solvent was removed and the solid obtained was dissolved in minimum amount of toluene. The toluene solution was poured into large excess of methanol. The precipitate was collected and dried to give 14.5 g of palladium phthalocyanine dye(yield=67.4%). λmax=692 nm; ε=1.75×10$^5$ cm$^{-1}$ mole$^{-1}$ l(toluene). Anal. Calcd. For $C_{60}H_{72}N_8O_4Pd$: C, 66.99%; H, 6.75%; N, 10.42%.

Found: C, 67.81%; H, 7.02%; N, 9.89%.

SOLUBILITY TEST

The results of the solubility tests are shown in the following table. The results clearly show that the solubility of the phthalocyanine dye with bicyclo alkoxy substitutents is better than the phthalocyanine dye with linear or branched substitutents.

| Sample | R1(%) Isoborenoxy (A), endo-Fensoxy(B) | R2(%) 2,4-dimethoxy-3-pentoxy | X | M | Solubility[1] 2% dye in MCH/1-propanol | Solubility[1] 2% dye in Dibutyl ether/1-propanol | Shelf life (Hrs)[2] 2% dye in MCH/1-propanol | Shelf life (Hrs)[2] 2% dye in Dibutyl ether/1-propanol |
|---|---|---|---|---|---|---|---|---|
| Example 1 | 100(A) | 0 |  | Pd | V | V | >168 | >168 |
| Example 2 | 100(A) | 0 |  | Pb | V | V | >168 | >168 |
| Example 3 | 100(B) | 0 |  | Pd | V | V | >168 | >168 |
| Example 4 | 100(B) | 0 |  | VO | V | V | 24 | >168 |
| Example 5 | 100(B) | 0 |  | Pb | V | V | >168 | >168 |
| Example 6 | 100(B) | 0 |  | Cu | V | V | 24 | >168 |
| Example 7 | 100(B) | 0 |  | Zn | V | V | >168 | >168 |
| Example 8 | 50/51(A/B) | 0 |  | Cu | V | V | >168 | >168 |
| Example 9 | 50(B) | 50 |  | Cu | V | V | >168 | >168 |
| Example 10 | 100(B) | 0 | Br | Pb | V | V | >168 | >168 |
| Comparative Example 1 |  | 100 |  | Cu | X | X | X | X |
| Comparative Example 2 |  | 100 |  | Pd | X | X | X | X |

1. The proportion of the solvent pairs is 90/10; V totally dissolved; X not totally dissolved
2: The time before precipitates were observed from the 2% solution.

PREPARATION OF OPTICAL RECORDING MEDIUM

A 2 g sample of phthalocyanine dye was dissolved in 100 ml of methyl cyclohexane (MCH)/1-propanol(90/10). The solution was passed through a 0.45 μm filter. A polycarbonate substrate with diameter of 12 cm, pregroove of 160 nm depth and 0.8 μm width was prepared by injection molding. The solution polycarbonate substrate with a programmed speed and time. The result disks were baked at 85° C. for 90 min. The Ag reflection layer was formed by sputtering on the dye layer. A UV curable protective lacqer from Dainippon Ink (SD-17) was spin coated on the Ag layer and cured. Pulstec CD-R tester was used to examine the disk. The test results were shown in the following table.

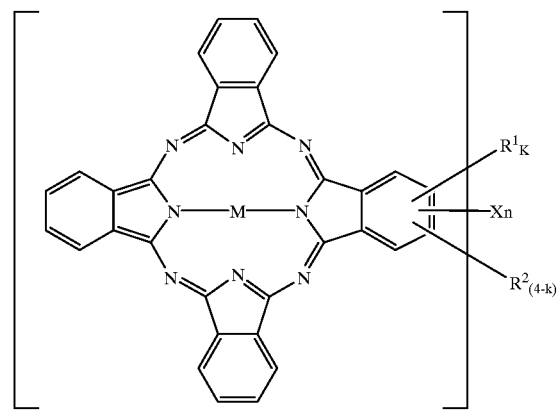

(I)

wherein:

M is Pb, Pd, Ni, Cu, Zn, Co, Mg, Fe, VO or TiO

| Sample | TEb | Igb | IIb | RCb | I3/Itop | I11/Itop | Bler | Jitter pit 3T | Jitter pit 11T | Jitter land 3T | Jitter land 11T |
|---|---|---|---|---|---|---|---|---|---|---|---|
| Example 3 | 0.440 | 0.576 | 0.638 | 0.112 | 0.354 | 0.634 | 2.3 | 22.5 | 24 | 31.7 | 30.5 |
| Example 7 | 0.438 | 0.578 | 0.639 | 0.110 | 0.380 | 0.620 | 2.1 | 23.1 | 23.9 | 31.9 | 29 |
| Example 9 | 0.430 | 0.586 | 0.725 | 0.116 | 0.401 | 0.705 | 5.1 | 36.3 | 35.4 | 36.2 | 37.5 |
| Example 10 | 0.422 | 0.657 | 0.765 | 0.082 | 0.389 | 0.690 | 2.0 | 34.2 | 34.3 | 35.6 | 34.2 |

What is claimed is:

1. An optical recording medium comprising a transparent substrate, a recording layer, a reflecting layer and a protecting layer; wherein the improvement comprises the recording layer containing one or a mixture of more than one phthalocyanine dye can be represented by formula (I)

X is Cl, Br or I n is 0 or an integer of 1 to 4 k is any number from 1 to 4

$R^1$ is alkoxy substitutent derived from hydroxy-containing bicyclo-alkyl compounds; the hydroxy-containing bicyclo-alkyl compounds can be represent by formula (II) and (III);

(II)

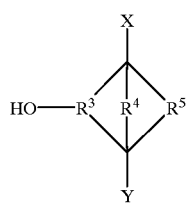

(III)

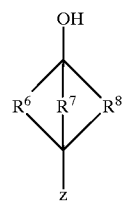

wherein, X Y and Z are, independent from each other, a hydrogen, halogen, methyl or ethyl groups $R^3$, $R^4$, $R^5$, $R^6$, $R^7$ and $R^8$ are, independent from each other, $C_{1-4}$ linear or branched alkyl group with or without halogen substitutent groups, $R^2$ is $C_{1-20}$ linear alkyl group with or without substitutent group, $C_{1-20}$ branched alkyl group with or without substitutent group, $C_{1-20}$ linear alkoxy group with or without substitutent group, $C_{1-20}$ branched alkoxy group with or without substitutent group and aryloxy groups with or without substitutent group.

2. An optical recording medium as in claim 1, wherein the substitutent group are halogen, $OR^9$, $SO_2R^{10}$, $OCOR^{11}$, $COOR^{12}$, $NR^{13}R^{14}$, wherein $R^9$, $R^{10}$, $R^{11}$, $R^{12}$, $R^{13}$ and $R^{14}$ are $C_{1-12}$ linear or branched alkyl groups.

* * * * *